(12) United States Patent
Hsu

(10) Patent No.: US 6,515,072 B2
(45) Date of Patent: Feb. 4, 2003

(54) TRANSPARENT RUBBER-MODIFIED STYRENIC RESIN COMPOSITION

(75) Inventor: Ray-Hsi Hsu, Tainan Hsien (TW)

(73) Assignee: Chi Mei Corporation, Tainan Hsien (TW)

( * ) Notice: Subject to any disclaimer, the term of this patent is extended or adjusted under 35 U.S.C. 154(b) by 0 days.

(21) Appl. No.: 09/730,543

(22) Filed: Dec. 7, 2000

(65) Prior Publication Data

US 2002/0032282 A1 Mar. 14, 2002

(30) Foreign Application Priority Data

Jul. 11, 2000 (TW) .................................... 89113778 A

(51) Int. Cl.$^7$ ............................................. C08L 53/02
(52) U.S. Cl. .............................. 525/93; 525/95; 525/98; 525/99
(58) Field of Search ............................. 525/93, 95, 98, 525/99

(56) References Cited

U.S. PATENT DOCUMENTS 5,434,219 A * 7/1995 Oomura et al. ................ 525/84

* cited by examiner

*Primary Examiner*—Jeffrey Mullis
(74) *Attorney, Agent, or Firm*—Finnegan, Henderson, Farabow, Garrett & Dunner, L.L.P.

(57) ABSTRACT

A transparent rubber-modified styrenic resin composition contains a rubber-particle-dispersed phase (A) and a copolymer matrix (B). The phase (A) contains a rubbery copolymer which is a block copolymer formed from 10 to 50 wt % of styrenic monomers and 90 to 50 wt % of dienic monomers, wherein the rubbery copolymer block contains polystyrene block in an amount of 5 to 35 wt % based on total weight of the rubbery copolymer. The copolymer matrix (B) is composed of 12 to 70 parts by weight of styrenic unit, 20 to 80 parts by weight of (meth)acrylate unit, 1 to 20 parts by weight of vinyl cyanide unit, and 0 to 40 parts by weight of other copolymerizable monomer units, based on 100 parts by weight of total monomer unit. The content of the copolymer matrix (B) having a molecular weight of 3,000~50,000 is in an amount of 15 to 50 wt %, based on the total weight of the copolymer matrix (B).

7 Claims, No Drawings

TRANSPARENT RUBBER-MODIFIED STYRENIC RESIN COMPOSITION

BACKGROUND OF THE INVENTION

1. Field of the Invention

The present invention relates to a transparent rubber-modified styrenic resin composition, more particularly to a resin composition which comprises a copolymer matrix and a rubber-particle-dispersed phase formed from rubbery copolymer and which has good chemical resistance, processability, transparency, and impact resistance.

2. Description of the Related Art

Rubber-modified styrenic resin is known to have high toughness and good processability, and is thus widely used in food containers, packaging materials, and housings of household, electrical appliances and office appliances. However, the conventional rubber-modified styrenic resin is generally opaque, and cannot be used to form a transparent article. In the art, it has been suggested that the styrenic resin be blended with a styrene-butadiene block copolymer. However, the resulting styrenic resin composition is not significantly improved in its toughness, and is thus not satisfactory.

Japanese Laid-Open Patent No. 4-180907 discloses a method for polymerizing styrene and methyl methacrylate in the presence of a styrene-butadiene block copolymer. The resulting resin has enhanced transparency and toughness, but it is not satisfactory in processability. Japanese Laid-Open patent No. 8-239532 discloses a resin composition formed from a styrene-butadiene rubber having 1 to 13.8 wt % of 1,2-vinyl unit and styrene-methylmethacrylate copolymer, which have refractive indexes proximate to each other. This resin composition has an average particle size of 0.1 to 2 μm, with a particle size distribution index of 2 to 5. While this resin composition has improved transparency and impact resistance, its chemical resistance is insufficient.

It has been found by the applicant that by dispersing rubber particles into a copolymer matrix formed from styrenic monomers, (meth)acrylate monomers and vinyl cyanide monomers, and by controlling the specific morphology of rubber particles and specific molecular distribution of the copolymer matrix, a rubber-modified styrenic resin composition of improved transparency and chemical resistance can be obtained.

SUMMARY OF THE INVENTION

Therefore, the object of the present invention is to provide a transparent rubber-modified styrenic resin composition having good chemical resistance, good processability, high transparency and good impact resistance.

Accordingly, the transparent rubber-modified styrenic resin composition of the present invention comprises:(1) a rubber particle dispersed phase (A) including a rubbery copolymer which is a block copolymer formed from 10 to 50 weight percent of styrenic monomers and 90 to 50 wt % of dienic monomers; wherein said rubbery copolymer contains a polystyrene block in an amount of 5 to 35 wt %, based on total weight of the rubbery copolymer; and (2) a copolymer matrix (B) which is composed of 12 to 70 parts by weight of styrenic unit, 20 to 80 parts by weight of (meth)acrylate unit, 1 to 20 parts by weight of vinyl cyanide unit, and 0 to 40 parts by weight of other copolymerizable monomer units, based on 100 parts by weight of total monomer units. The content of the copolymer matrix (B) having a molecular weight of 3,000~50,000 is in an amount of 15 to 50 wt %, based on the total weight of the copolymer matrix (B). The aforementioned unit means monomers which are polymerized into polymeric form and which are composed of the polymer. For example, a styrenic unit is a polymerized styrenic monomer derivative in the polymer.

DETAILED DESCRIPTION OF THE PREFERRED EMBODIMENTS

The rubbery copolymer used in the present invention is a block copolymer prepared by anionic polymerization, in which styrenic monomers and dienic monomers are polymerized in the presence of an organic solvent and an organo-lithium compound as the initiator. The rubbery copolymer has a Moony Viscosity ($ML_{1+4}$) of 20 to 80 and a solution viscosity of 3 to 60 cps (5 wt % in SM at 25° C.). The rubbery copolymer contains more than 8 weight percent of 1,2-vinyl structure of the dienic unit. The rubbery copolymer contains 5 to 35 wt % of polystyrene block. The rubbery copolymer may have the following block structures: homopolymer block structure, random copolymer block structure, tapered block structure, linear structure, and branch structure. Representative examples of the aforementioned structures are as follows:

1. Linear Block Copolymer:
    (1) $(A-B)_n$
    (2) $A(B-A)_n$
    (3) $B(A-B)_n$
    wherein, polymer block A consists essentially of styrenic unit, polymer block B consists essentially of dienic unit, and n is an integer equal to or greater than 1.
2. Branch Block Copolymer:
    (1) $[(B-A)_n]_{m+1}X$
    (2) $[(A-B)_n]_{m+1}X$
    (3) $[(B-A)_nB]_{m+1}X$
    (4) $[(A-B)_nA]_{m+1}X$
    wherein, A and B are as defined above, X is a residue of a coupling agent (such as silicone tetrachloride and tin tetrachloride) or a multi-functional organolithium, and n and m are integers of 1 to 10.
3. Mixtures of the linear block copolymers and the branch block copolymers described in Items 1 and 2, shown above.

Representative examples of the tapered block copolymer are:

D-D/S-S $(S-D/S)_n$-S
D-S-D/S-S D/S-$(S-D/S)_n$
D-S-D/S-S-D X-$[(S-D/S)_n]_{m+1}$
S-D-D/S-S X-$[(D/S-S)_n]_{m+1}$
D/S-S-D-S X-$[(S-D/S)_n-S]_{m+1}$
S-D/S-S X-$[(D/S-S)_n-D/S]_{m+1}$
$(S-D/S)_n$ D-D/S-S-S-D/S-D wherein, S is polystyrenic block, D is polydienic block, D/S is adienic/styrenic tapered block copolymer, X is the residue of a multi-functional initiator or a multi-functional coupling agent, and m and n are integers of 1 to 10. In the present invention, the tapered block structure is preferred. Among the above-mentioned examples, D-D/S-S, D-S-D/S-S, and D-D/S-S-S-D/S-D are more preferred.

The rubbery copolymer of the present invention contains the polystyrene block in an amount of 5 to 35 weight percent, preferably 10 to 25 wt %, more preferably 14 to 22 wt %, based on total weight of the rubbery copolymer. When the content of the polystyrene block is less than 5 wt %, the resin composition is poor in transparency. On the other hand, when the content of the polystyrene block is more than 35 wt %, the impact strength of the resin composition would not be satisfactory. The content of 1,2-vinyl structure of the rubbery copolymer used in the present invention is more than 8 wt %, preferably more than 14 wt %. When the content of the 1, 2-vinyl structure is more than 14 wt %, a better balance of good transparency and high impact resistance of the resin composition can be attained.

Examples of the styrenic monomers of the rubbery copolymer of the present invention are styrene, α-methyl styrene, para-methyl styrene, meta-methyl styrene, ortho-methyl styrene, ethyl styrene, 2,4-dimethyl styrene, para-tert-butyl styrene, α-methyl-para-methyl styrene, bromo-styrene, dibromo-styrene, and 2,4,6-tribromo-styrene. The aforementioned styrenic monomers can be used alone or in combination with one another.

Examples of the dienic monomers of the rubbery copolymer of the present invention are 1,3-butadiene, 2-methyl-1, 3-butadiene, 2-ethyl-1,3-butadiene, 2,3 -dimethyl-1,3-butadiene, isoprene, and 1,3-hexadiene. The aforementioned monomers can be used alone or in combination with one another. Among the aforementioned monomers, 1,3-butadiene and isoprene are preferred.

The organolithium compound used in the preparation of the rubbery copolymer is a compound containing at least one lithium atom. Examples of organolithium initiators are ethyllithium, n-pentyllithium, iso-propyllithium, n-butyllithium, sec-butyllithium, hexyllithium, cyclohexyllithium, phenyllithium, benzyllithium, naphthyllithium, tert-butyllithium, tri-methylene di-lithium, tetra-methylene di-lithium, butadiene di-lithium, and iso-pentadiene di-lithium. The aforementioned organolithium compounds can be used alone or in combination with one another.

The polymerization rate, the content of the 1,2-vinyl structure, and the random structures of the dienic unit and the styrenic unit can be adjusted with the use of a polar compound or a randomizer. The polar compound and the randomizer are selected from the group consisting of ethers, amines, thio-ether, alkylbenzene, sulfonate salt, potassium alkyl oxide and sodium alkyl oxide.

The transparent rubber-modified styrenic resin composition of the present invention contains 1 to 40 wt % of the rubbery copolymer. When the content of the rubbery copolymer is less than 1 wt %, the impact resistance of the resin composition would be inefficient. When the content of the rubbery copolymer is more than 40 wt %, the transparency and the processability would not be satisfactory.

In the present invention, the copolymer matrix (B) is composed of styrenic unit in an amount of 12 to 70 parts by weight, (meth)acrylate unit in an amount of 20 to 80 parts by weight, vinyl cyanide unit in an amount of 1 to 20 parts by weight, and other copolymerizable monomer units in an amount of 0 to 40 parts by weight. In view of better balance of chemical resistance, stiffness, and transparency required in the present invention, the amount of the vinyl cyanide unit is preferably 2 to 12 parts by weight, more preferably 2 to 10 parts by weight. Examples of the styrenic monomers of the styrenic unit described above are the same as those described in the preparation of the rubbery copolymer, and are not further explained hereinafter.

The (meth)acrylate monomers of the (meth)acrylate unit described above are selected from methacrylate monomers and acrylate monomers. Examples of methacrylate monomers are methyl methacrylate, ethyl methacrylate and butyl methacrylate. Examples of acrylate monomers are methyl acrylate, ethyl acrylate, n-butyl acrylate, 2-methylpentyl acrylate, 2-ethylpentyl acrylate, and octyl acrylate. Methyl methacrylate, n-butyl acrylate and methyl acrylate are preferred. Examples of the vinyl cyanide monomers of the vinyl cyanide unit are acrylonitrile and α-methyl acrylonitrile. The vinyl cyanide unit is in an amount of 1 to 20 parts by weight. When the content of the vinyl cyanide unit is less than 1 part by weight, the chemical resistance and tensile strength of the resin composition will be poor. When the content of the vinyl cyanide unit is more than 20 parts by weight, the transparency, color appearance and processability of the resin composition would be worse.

The copolymerizable monomers for use in preparing the copolymer matrix (B) are not limited to any specie provided that the resulting resin composition attained a desired transparency. Examples of the copolymerizable monomers include unsaturated fatty acids, such as itaconic acid, maleic acid, fumaric acid, butenic acid, and cinnamic acid; maleimide-based monomers, such as N-methyl maleimide, N-ethyl maleimide, N-butyl maleimide, N-octyl maleimide, N-isopropyl maleimide, N-phenyl maleimide, N-para-bromo-phenyl maleimide, N-ortho-chloro-phenyl maleimide, and N-cyclohexyl maleimide; unsaturated carboxylic anhydrides, such as maleic anhydride, itaconic anhydride, and citraconic anhydride; amine-containing unsaturated compounds, such as propenyl amine, allyl amine, diethylaminoethyl (meth)acrylate and dimethylaminopropyl (meth)acrylate; and acrylamide-based compounds, such as acrylamide and N-methyl acrylamide.

The content of the copolymer matrix (B) in the resin composition of the present invention having a molecular weight of 3,000~50,000 is in an amount of 15 to 50 wt %, preferably 20 to 45 wt %, more preferably 25 to 40 wt %, based on the total weight of the copolymer matrix (B). When the content of the copolymers having a molecular weight of 3,000~50,000 is greater than 15 wt %, the processability of the resin composition is good. When the content of the copolymers matrix having a molecular weight in the aforementioned range is lower than 50 wt %, the impact strength and the chemical resistance of the resin will be better. As such, the resin composition can have high impact resistance, good processability and chemical resistance.

The copolymer matrix (B) in the present invention may be linear or branch in polymer chain structure. When the copolymer matrix (B) is a branch structure, a better balance of impact strength and processability of the resin composition can be obtained. The branch copolymer matrix (B) can be prepared by adding one or more of a multi-functional unsaturated monomer, a multi-functional initiator, and a multi-functional chain transfer agent during polymerization.

The content of rubber particles having at least four occlusions are 2 to 20%, preferably 3 to 15%, more preferably 3 to 10%, based on the total number of rubber particles of the rubber-particle-dispersed phase (A). The content of rubber particles having no occlusions is 20 to 80%, preferably 30 to 75%, more preferably 40 to 70%, based on the total number of rubber particles of the rubber-particle-dispersed phase (A). When the morphology of the rubber particles of the resin composition is within the aforementioned ranges, better transparency and impact strength can be obtained.

The so-called "occlusion" is a styrenic-(meth)acrylate-acrylonitrile- (optionally co-monomer) copolymer particle encapsulated within the rubber particle, and which occlusion particle size is greater than or equal to 0.05 μm. The rubber particle having no occlusions means that the rubber particle does not contain any occlusions as described above. Of course, the rubber particle having encapsulated styrenic-(metha)acrylate-acrylonitrile-(optionally co-monomer) copolymer particles which are smaller than 0.05 μm in size is also inside the definition of "rubber particles having no occlusions".

The haze of the resin composition of the present invention can be kept at a level below 11.0 (ASTMD-1003, thickness 3 mm) by adjusting the polymerization conditions, the addition of additives, and the conditions of the devolatilizing and extrusion steps.

In the resin composition of the present invention, the weight average molecular weight of the copolymer matrix (B) is not particularly limited, and is typically in the range of 50,000~300,000, preferably in the range of 60,000~200,000, more preferably in the range of 70,000~150,000. When the weight average molecular weight is higher than 50,000, the impact resistance of the resin composition is good. When the weight average molecular weight is lower than 300,000, the processability (flowability) and the transparency of the resin composition are good. The weight average particle size of the rubber particles of the resin composition of the present invention is not particularly limited, and is typically in the range of 0.1 to 2.0 μm, preferably in the range of 0.1 to 1.5 μm, more preferably in the range of 0.2 to 1.0 μm. When the weight average particle size of the rubber particles is not smaller than 0.1 μm, the impact strength of the resin composition is good. When the weight average particle size of the rubber particles is not larger than 2.0 μm, the transparency of the resin composition would be good. The morphologies of the rubber particles, including weight average particle size of the rubber particles and the content of rubber particles having occlusions or not as mentioned above, are determined by cutting a thin section from the resin composition, and photographing the thin section with the use of a transmission electron microscope (TEM). The rubber morphologies are determined with at least 200 rubber particles on the TEM photograph. The weight average particle size can be calculated through the following formula:

Weight average particle size=$\Sigma n_i D_i^4 / \Sigma n_i D_i^3$ wherein ni is the number of rubber particles having a diameter of Di.

The gel content (insoluble parts of the resin composition) is not particularly limited, and is typically in the range of 2 to 40 wt %, preferably in the range of 8 to 35 wt %, more preferably in the range of 12 to 30 wt %. When the gel content is not less than 2 weight percent, the impact strength of the resin composition would be good. When the gel content is not more than 40 wt %, the flowability, the processability and the transparency of the resin composition would be good. Besides, the swelling index of the resin composition of the present invention is not particularly limited, and is typically in the range of 2 to 25, preferably in the range of 3 to 20, more preferably in the range of 5 to 15. When the swelling index of the resin composition is in the range of 2 to 25, the balance of impact strength and transparency of the resin composition is good.

The gel content of the resin composition and the swelling index of the resin composition are determined by dissolving 1 gram of the resin composition in a solution containing toluene and acetone (in a volume ratio of 1:1) at a temperature of 25° C. for twenty-four hours. The solution mixture is then centrifuged at 15000 rpm for 20 minutes to separate into two phases. The lower part (phase) which contains the insoluble gel in swelled form is removed, and is vacuum-dried at 80° C. for 12 hours to obtain the insoluble gel in dried form. The gel content (wt %) of the resin composition is calculated through the following formula:

Gel content (wt %)=(weight of the insoluble gel in dried form)/(weight of the resin composition)×100%

The swelling index is calculated through the following formula:

Swelling index=(weight of the insoluble gel in swelled form)/weight of the insoluble gel in dried form)

The rubber-modified styrenic resin composition of the present invention can be prepared by polymerizing styrenic monomers, (meth)acrylate monomers, vinyl cyanide monomers, and optionally, other copolymerizable monomers in the presence of the rubbery copolymer via bulk or solution graft polymerization with a continuous or batch process. In the case of continuous solution polymerization, the aforementioned rubbery copolymer and monomers are added with a suitable solvent to form a solution of raw material mixtures, which is allowed to dissolve within a dissolving tank having high shear and high stirring rate. The dissolving tank could be one having a screw-type agitator or other types of agitators capable of generating high shear. After a sufficient period of mixing time, the rubbery copolymer is completely dissolved to form a rubber solution which can be conveniently delivered to a reactor by pumping. The aforementioned raw material solution or monomers is fed continuously into a first and/or a second reactor and/or a subsequent reactor. The chain transfer agent and the initiator are added as required into the first reactor and/or the second reactor and/or the following reactor for graft polymerization.

The aforementioned reactor could be a continuous stirring tank reactor (CSTR), a plug flow reactor, a static mixer type reactor, or a combination of the same type or different types of the aforementioned reactors. The reaction temperature is controlled to be in the range of 70 to 230° C. The final conversion of monomers is in the range of 30 to 95%, preferably in the range of 50 to 90%.

Preferably, the first reactor is a continuous stirring tank reactor (CSTR), and is connected with the second and/or the following reactors, which could be a continuous stirring tank reactor, a plug flow reactor or a static mixer type reactor.

The conversion in the first reactor is typically in the range of about 1 to 30 wt %, preferably 2 to 25 wt %, more preferably 3 to 22 wt %. The conversion in the first reactor is adjusted according to the amount, the species, and the viscosity of the rubbery copolymer such that phase inversion of the rubber does not occur in the first reactor, and occurs in the subsequent reactors (i.e., the second or the third reactor) to result in good physical properties.

The solvent for use in the polymerization of the transparent rubber-modified styrenic resin composition of the present invention can be selected from the group consisting of aromatic hydrocarbons, ketones, and esters. Among the aromatic hydrocarbons, toluene, ethylbenzene, and xylene are preferred. Among the ketones, butanone is preferred. Among the esters, ethyl acetate is preferred. Besides, aliphatic hydrocarbons, such as n-hexane, cyclehexane and n-heptane, could be used as the solvent.

The amount of the initiator added during the polymerization of the transparent rubber-modified styrenic resin composition of the present invention is 0 to 2 parts by weight, preferably 0.001 to 0.7 part by weight based on 100 parts of monomers. Examples of the initiators are benzoyl peroxide, dicumyl peroxide, t-butyl peroxide, t-butyl hydroxy peroxide, cumene hydroperoxide, t-butyl peroxy benzoate, di-2-ethylhexyl peroxy dicarbonate, tert-butyl peroxy iso-propyl carbonate (BPIC), cyclohexanone peroxide, 2,2'-azo-bis-isobutyronitrile, 1,1'-azo-bis-1-cyclohexane carbonitrile, 2,2'-azo-bis-2-methyl butyronitrile, azo-bis-isobutyronitrile, 1,1-di-t-butyl peroxy cyclohexane (TX-22), 1,1-di-t-butylperoxy-3,3,5-trimethyl cyclohexane (TX-29A), 2,5-dimethyl-2,5-bis- (2-ethylhexanoxyperoxy)hexane, 4-(t-butyl peroxy carbonyl)-3-hexyl-6-[7-(t-butyl peroxy carbonyl)heptyl]cyclohexane, di-t-butyl-diperoxyazelate), 2,5-dimethyl-2,5-bis-(benzoyl peroxy)hexane, di-t-butyl peroxy-hexahydro-terephthalate (BPHTP), and 2,2-bis-(4,4-di-t-butyl peroxy)cyclohexanyl propane.

The amount of the chain transfer agent added during the polymerization of the styrenic resin composition of the present invention is in the range of 0 to 2 parts by weight, preferably 0.01 to 0.7 part by weight based on 100 parts by weight of monomers. Examples of the chain transfer agent are as follows:

(1) Mercaptans, such as methyl mercaptan, n-butyl mercaptan, cyclohexyl mercaptan, n-dodecyl mercaptan, stearyl mercaptan, t-dodecyl mercaptan (TDM), n-propyl mercaptan, n-octyl mercaptan, tert-octyl mercaptan, and tert-nonyl mercaptan.

(2) Alkyl amines, such as ethylamine, diethylamine, triethylamine, isopropylamine, diisopropylamine, dipropylamine, butylamine, di-n-butylamine, and tri-n-butyl amine.

(3) Pentaerythritol tetrakis(3-mercapto propionate), pentaerythritol tetrakis(2-mercapto ethanate), pentaerythritol tetrakis(4-mercapto butanate), pentaerythritol tetrakis(5-mercapto pentanate), pentaerythritol tetrakis(6-mercapto hexanate), trimethylolpropane tris(2-mercapto ethanate), trimethylolpropane tris(3-mercapto propionate) (TMPT), trimethylolpropane tris (4-mercapto butanate), trimethylolpropane tris (5-mercapto pentanate), and trimethylolpropane tris (6-mercapto hexanate).

Other examples of the chain transfer agent are pentaphenylethane, α-methyl styrene dimer, and terpinolene.

The aforementioned multifunctional unsaturated monomers are added in an amount of 0 to 1 part by weight, preferably 0.005 to 0.6 part by weight based on 100 parts by weight of monomers. Examples of the multi-functional unsaturated monomers are:

(1) Vinyl benzene based monomers, such as divinyl benzene, 1,2,4-trivinyl benzene, and 1,3,5-trivinyl benzene.

(2) Dimethacrylate monomers, such as ethylene glycol dimethacrylate, diethylene glycol dimethacrylate, triethylene glycol dimethacrylate, polyethylene glycol dimethacrylate, 1,3-propylene glycol dimethacrylate, 1,4-butylene glycol dimethacrylate, 1,6-hexanene glycol dimethacrylate, neopentyl glycol dimethacrylate (PGDMA), dipropylene glycol dimethacrylate, polypropylene glycol dimethacrylate, and 2,2-bis-(4-methacryloxy diethoxy phenyl) propane.

(3) Trimethacrylates, such as trimethylol propane trimethacrylate, and triethylol ethane trimethacrylate.

(4) Diacrylates, such as ethylene glycol diacrylate, diethylene glycol diacrylate, triethylene glycol diacrylate, polyethylene glycol diacrylate, 1,3-di-propylene glycol diacrylate, 1,4-di-butylene glycol diacrylate, 1,6-hexylene glycol diacrylate, neopentyl glycol diacrylate (PGDA), dipropylene glycol diacrylate, polypropylene glycol diacrylate, 2,2-bis (4-acryloxy propoxy phenyl)propane, and 2,2-bis (4-acryloxy diethoxy phenyl)propane.

(5) Triacrylates, such as trimethylol propane triacrylate, and triethylol ethane triacrylate.

(6) Tetraacrylates, such as tetramethylol methane tetraacrylate.

After the polymerization is completed, the resulting copolymer solution is removed from the reactor, and is devolatilized through the devolatilizing device for removing volatile components, such as unreacted monomers and solvent, to produce the transparent rubber-modified styrenic resin composition of the present invention.

The devolatilizing device could be a single or twin screw extruder with at least one degassing vent. If necessary, stripping agents, such as water, cyclohexane, and carbon dioxide, may be added into the extruder. The extruder may be provided with a kneading zone and a pumping zone. The screw rotates at a rate in the range of 120 to 350 rpm. Alternatively, a devolatilizing tank with vacuum may be used. Devolatilization can be accomplished through a single devolatilizing tank or through a plurality of the devolatilizing tanks that are connected in series or the combination of devolatilizing tank and extruder. The temperature of the devolatilizing tank is controlled to be in the range of 180 to 350° C., preferably in the range of 200 to 320° C., more preferably in the range of 220 to 300° C. The devolatilizing tank is controlled at a degree of vacuum below 300 Torr, preferably below 200 Torr, more preferably below 100 Torr. other kinds of devolatilizing devices, such as a thin film evaporator, may also be used.

After the devolatilization stage, the content of volatile components of the styrenic resin including residual monomers, solvent, dimers and trimers, is reduced to a level below 1 wt %, preferably below 0.8 wt %, more preferably below 0.5 wt %.

As long as the properties of the styrenic resin composition of the present invention is not significantly and adversely affected, other additives maybe added into the composition. The additives include coloring agents, fillers, flame retardants, flame retarding aids (such as antimony trioxide), light stabilizers, thermal stabilizers, plasticizers, lubricants, releasing agents, stickening agent, anti-static agents, antioxidants, and electrical conduction additives. Examples of the additives are mineral oil, ester-based plasticizers such as butyl stearate, polyester-type plasticizers, polyorganosiloxanes such as polydimethylsiloxanes, fatty acids and their metal salts, hindered amine-based anti-oxidants, and glass fibers. The additives can be used alone or in combination with one another, and can be added during the polymerization or after the polymerization is completed.

The ester-based plasticizer or the mineral oil is used in an amount of 0 to 5 wt %, preferably 0.05 to 2 wt %, based on the weight of the resin composition. The polyorganosiloxane is used in an amount of 0 to 0.5 wt %, preferably 0.002 to 0.2 wt %.

As long as the transparency of the styrenic resin composition of the present invention is not significantly and adversely affected, other resins may be added into the composition. The resins include styrenic-(meth)acrylate-acrylonitrile copolymer, styrenic-(meth)acrylate copolymer, styrenic-(meth) acrylate-acrylonitrile-maleimide copolymer, styrenic-(meth)acrylate-maleimide copolymer, (meth)acrylate-maleimide copolymer, and dienic rubber-modified resin of the aforementioned copolymer (e.g. blended with or grafted with rubbery polymer).

The aforementioned resin is used in an amount of 0 to 200 parts by weight based on 100 parts by weight of the transparent rubber-modified styrenic resin composition, and it can modify or promote heat-resistance, tensile strength and processability of the resin composition.

Processing of the transparent rubber-modified styrenic resin composition of the present invention is not particularly limited. The present invention is suitable for injection molding, compression molding, extrusion molding, blow molding, thermoforming, and vacuum forming.

In preparing the transparent rubber modified styrenic resin composition, the styrenic resin and other additives or other resins are blended by using a conventional mixing device, such as Brabender plastificator, Banbury mixer, a roll kneader, and a single or twin-screw extruder. After extrusion, the resulting resin is cooled and pelletized. The blending procedure is typically conducted at a temperature in the range of 160 to 280° C., preferably in the range of 180 to 250° C.

The present invention is more specifically described and explained through the following examples and tests of physical properties. Unless otherwise indicated, the parts and percents are all based on weight in the Examples. It is to be understood, however, that the following Examples are merely illustrative and are not intended to limit the scope of the invention.

[Physical Property Test]

(1) Processability(flowability, MI): The melt index of the styrenic resin is tested under 200° C.×5 kg according to ASTM D-1238.

(2) Chemical resistance (oil resistance): A 230 mm (length)×2 mm (thickness) test piece of the resin composition is formed by injection molding, and measured by a bending form tester. The surface of the test piece is coated with olive oil and is then placed in the bending form tester with a curved bow shape at room temperature for 6 hours. Thereafter, the appearance of the test piece is inspected.
- ○: No change was found in the appearance of the test piece.
- Δ: Small cracks were found in the appearance of the test piece.
- X: Large cracks were found in the appearance of the test piece.

(3) Izod impact strength: Determined according to ASTM D-256 (A notched test piece with a thickness of ¼ inch is tested at 23° C.).

(4) Transparency (Haze): A 3 mm thick test piece is formed by injection molding and is tested according to ASTM D-1003. A high value of Haze indicates that the resin composition has poor transparency.

(5) Determination of the content (wt %) of the copolymer matrix (B) having a molecular weight in the range of 3,000~50,000: The styrenic resin composition is dissolved in tetrahydrofuran (THF). The insoluble part is removed by centrifuge. The molecular weight distribution of the soluble parts is determined by gel permeation chromatography (GPC) using polystyrene as the standard. On the GPC chart, the area corresponding to molecular weight in the range of 3,000~12,000,000 is integrated and is taken as $X_1$. The area corresponding to molecular weight in the range of 3,000 to 50,000 is integrated and is taken as $X_2$. The content of the copolymer matrix (B) having a molecular weight in the range of 3,000~50,000 is $X_2/X_1 \times 100$ wt %. The GPC is conducted under the following parameters:

Column: KD-806M; Detector: RI-410, UV-486; Mobile phase: THF(flow rate 1.0 c.c./min).

(6) Determination of the content of polystyrene block in rubbery copolymer (wt %): The rubbery copolymer is dissolved in 1,2-di-chloro-benzene (35 ml) with heating. The solution is then added with t-butyl hydroperoxide solution (10 ml) and osmium tetraoxide solution (1 g $OsO_4$/1L toluene), and is continuously heated and stirred for 15 minutes. After cooling, the solution is added with 350 ml of methanol and 5 drops of sulfuric acid, and is stirred. Then, the solution is filtered through a filter paper, and the residue is dried and weighted.

Content of polystyrene block (wt %)=(weight of dried residue after filtering)/(weight of the rubber copolymer)× 100%

(7) The content(%) of 1,2-vinyl structure in the rubbery copolymer is determined by IR analysis.

(8) Determination of content (%) of occlusions of the rubber particles: The resin composition is microtomed and photographed by transmission electron microscope to get a 25,000-times magnified photograph. A 12 cm×16 cm area on the photograph is taken into consideration. N is the total number of the rubber particles. $N_1$ is the number of rubber particles having at least four occlusions (with occlusion size≧0.05 μm). $N_2$ is the number of rubber particles having occlusions of smaller than 0.05 μm or without any occlusions.

$N_1/N \times 100\%$=content(%) of rubber particles having at least four occlusions $N_2/N \times 100\%$=content(%) of rubber particles having no occlusions

EXAMPLES

Example 1

8.4 parts by weight of rubbery copolymer (styrene/butadiene=25 wt %/75 wt %, content of 1,2-vinyl structure= 15.4%, Moony viscosity=45, content of polystyrene block= 18 wt %), 21.6 parts by weight of styrene, 34.5 parts by weight of methyl methacrylate, 5.5 parts by weight of acrylonitrile, 30 parts by weight of ethylbenzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The rubbery copolymer is a tapered block copolymer which contains a polystyrene block, a polybutadiene block and a tapered styrene/butadiene block. The reaction temperature in the first reactor is controlled at 110° C. The reaction temperature in the second reactor is controlled at 115° C. The reaction temperature in the third reactor is controlled at 125° C. The reaction temperature in the fourth reactor is controlled at 130° C. The final conversion is 57% and the polymerization mixture is extruded through a devolatilizer to produce the transparent rubber-modified styrenic resin of the present invention.

The copolymer matrix of the resin composition contains 32 parts by weight of styrene unit, 60 parts by weight of methyl methacrylate unit, and 8 parts by weight of acrylonitrile unit. The content of copolymer matrix having a molecular weight in the range of 3,000~50,000 is 29 wt %. The content of rubber particles having at least four occlusions is 6%, while the content of rubber particles having no occlusions is 64%, based on the total number of the rubber particles. The physical properties of the resin so-produced are shown in Table 1.

Example 2

8.4 parts by weight of rubbery copolymer (the same as Example 1 except that content of 1,2-vinyl structure=18.0%, Moony viscosity=47 and content of polystyrene block=19 wt %), 22.8 parts by weight of styrene, 37.0 parts by weight of methyl methacrylate, 1.8 parts by weight of acrylonitrile, 30 parts by weight of ethyl benzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperature in the reactors are controlled at 110° C., 115° C., 125° C. and 130° C., respectively. The final conversion is 60%, and the polymerization mixture is extruded through a devolatilizer to produce the transparent rubber-modified styrenic resin of the present invention.

The copolymer matrix of the resin composition contains 34 parts by weight of styrene unit, 63 parts by weight of methyl methacrylate unit, and 3 parts by weight of acrylonitrile unit. The content of copolymer matrix having a molecular weight in the range of 3,000~50,000 is 34 wt %. The content of rubber particles having at least four occlusions is 8%, while the number of rubber particles having no occlusions is 60%, based on the total number of rubber particles. The physical properties of the resin so-produced are shown in Table 1.

Example 3

8.4 parts by weight of rubbery copolymer (the same as example 1), 22.8 parts by weight of styrene, 37.0 parts by weight of methyl methacrylate, 1.8 parts by weight of acrylonitrile, 30 parts by weight of ethyl benzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 110° C., 115° C., 125° C. and 13° C., respectively. The final conversion is 60%, and the polymerization mixture is extruded through a devolatilizer to produce the transparent rubber-modified styrenic resin.

The copolymer matrix of the resin composition contains 34 parts by weight of styrene unit, 63 parts by weight of methyl methacrylate unit, and 3 parts by weight of acrylonitrile unit. The content of copolymer matrix having a molecular weight in the range of 3,000~50,000 is 33 wt %. The content of rubber particles having at least four occlusions is 5%, while the content of rubber particles having no occlusions is 65%, based on the total number of rubber particles. The physical properties of the resin so-produced are shown in Table 1.

Example 4

8.4 parts by weight of rubbery copolymer (the same as example 1 except that content of 1,2-vinyl structure=12.5%, Moony viscosity=49 and content of polystyrene block=15 wt %), 22.8 parts by weight of styrene, 37.0 parts by weight of methyl methacrylate, 1.8 parts by weight of acrylonitrile, 30 parts by weight of ethyl benzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 110° C., 115° C., 125° C. and 130° C., respectively. The final conversion is 60%, and the polymerization mixture is extruded through a devolatilizer to produce the transparent rubber-modified styrenic resin of the present invention.

The copolymer matrix of the resin composition contains 34 parts by weight of styrene unit, 63 parts by weight of methyl methacrylate unit, and 3 parts by weight of acrylonitrile unit. The content of copolymer matrix having a molecular weight in the range of 3,000~50,000 is 36 wt %. The content of rubber particles having at least four occlusions is 4%, while the content of rubber particles having no occlusion is 58%, based on the total number of rubber particles. The physical properties of the resin so-produced are shown in Table 1.

Comparative Example 1

8.4 parts by weight of rubbery copolymer (the same as Example 1 except that styrene/butadiene=30 wt %/70 wt %, content of 1,2-vinyl structure=11.0%, and content of polystyrene block=21 wt %), 24.6 parts by weight of styrene, 37.0 parts by weight of methyl methacrylate, 30 parts by weight of ethyl benzene, 0.07 part by weight of dodecyl mercaptan, and 0.12 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 95° C., 110° C., 120° C. and 125° C., respectively. The final conversion is 55%, and the polymerization mixture is extruded through a devolatilizer to produce a rubber-modified styrenic resin.

The copolymer matrix of the resin composition contains 37 parts by weight of styrene unit and 63 parts by weight of methyl methacrylate unit. The content of copolymer matrix having a molecular weight in the range of 3,000~50,000 is 12 wt %. The content of rubber particles having at least four occlusions is 1.8%, while the content of rubber particles having no occlusions is 75%, based on the total number of rubber particles. The physical properties of the resin so-produced are shown in Table 1.

Comparative Example 2

8.4 parts by weight of rubbery copolymer (the same as Example 1 except that styrene/butadiene=15/85 wt %, content of 1,2-vinyl structure=15.4%, and content of polystyrene block=2 wt %), 30.0 parts by weight of styrene, 28.0 parts by weight of methyl methacrylate, 3.6 parts by weight of acrylonitrile, 30 parts by weight of ethyl benzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 110° C., 115° C., 125° C. and 130° C., respectively. The final conversion is 58%, and the polymerization mixture is extruded through a devolatilizer to produce a rubber-modified styrenic resin.

The copolymer matrix of the resin composition contains 47 parts by weight of styrene unit, 47 parts by weight of methyl methacrylate unit, and 6 parts by weight of acrylontitrile unit. The content of copolymer matrix having a molecular weight in the range of 3,000~50,000 is 33 wt %. The content of rubber particles having at least four occlusions is 9%, while the content of rubber particles having no occlusions is 15%, based on the total number of rubber particles. The physical properties of the resin so-produced are shown in Table 1.

Comparative Example 3

8.4 parts by weight of rubbery copolymer (styrene/butadiene=5/95 wt %, content of 1,2-vinyl structure=18.0%, block copolymer with a Moony viscosity of 45, and content of polystyrene block=0 wt %), 27.1 parts by weight of styrene, 32.7 parts by weight of methyl methacrylate, 1.8 parts by weight of acrylonitrile, 30 parts by weight of ethyl benzene, 0.1 part by weight of dodecyl mercaptan, and 0.1 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 110° C., 115° C., 125° C. and 130° C., respectively. The final conversion is 61%, and the polymerization mixture is extruded through a devolatilizer to produce a rubber-modified styrenic resin.

The copolymer matrix of the resin composition contains 44 parts by weight of styrene unit, 53 parts by weight of methyl methacrylate unit, and 3 parts by weight of acrylonitrile unit. The content of copolymer matrix having a molecular weight in the range of 3,000~50,000 is 33 wt %. The content of rubber particles containing at least four occlusions is 30%, while the content of rubber particles having no occlusions is 2%, based on the total number of rubber particles. The physical properties of the resin so-produced are shown in Table 1.

Comparative Example 4

8.4 parts by weight of rubbery copolymer (the same as example 1), 16.8 parts by weight of styrene, 43.0 parts by weight of methyl methacrylate, 1.8 parts by weight of acrylonitrile, 30 parts by weight of ethyl benzene, 0.25 part by weight of dodecyl mercaptan, and 0.14 part by weight of benzoyl peroxide are mixed to form a feed solution, which is then pumped continuously at a rate of 35 kg/hr into a continuous polymerization device including four continuous stirring tank reactors (each having a capacity of 40 liters) that are connected in series. The reaction temperatures in the reactors are controlled at 120° C., 125° C., 130° C. and 135° C. respectively. The final conversion is 62%, and the polymerization mixture is extruded through a devolatilizer device to produce a rubber-modified styrenic resin.

The copolymer matrix of the resin composition produced in this example contains 33 parts by weight of styrene unit, 64 parts by weight of methyl methacrylate unit, and 3 parts by weight of acrylonitrile unit. The content of copolymer matrix having a molecular weight in the range of 3,000~50,000 is 52 wt %. The content of rubber particles containing at least four occlusions is 5%, while the content of rubber particles having no occlusions is 65%, based on the total number of rubber particles. The physical properties of the resin so-produced are shown in Table 1.

Example 5

9.0 parts by weight of rubbery copolymer (the same as Example 1), 24.2 parts by weight of styrene, 33.2 parts by weight of methyl methacrylate, 1.8 parts by weight of acrylonitrile, 1.2 parts by weight of N-phenyl maleimide, 0.0045 part by weight of polydimethyl siloxane, 30.6 parts by weight of ethyl benzene, 0.1 part by weight of dodecyl mercaptan, and 0.1 part by weight of di-t-butyl peroxy-hexahydro-terephthalate (BPHTP) are mixed to form a feed solution, which is then pumped continuously at a rate of 35 kg/hr into a continuous polymerization device including four continuous stirring tank reactors (each having a capacity of 40 liters) that are connected in series. In addition, N-phenyl maleimide is pumped continuously into the second reactor at a rate of 0.32 kg/hr. The reaction temperatures in the reactors are controlled at 100° C., 105° C., 115° C. and 130° C., respectively. The final conversion is 60%, and the polymerization mixture is extruded through a devolatilizer to produce the transparent rubber-modified styrenic resin of the present invention.

The copolymer matrix of the resin composition contains 28 parts by weight of styrene unit, 66 parts by weight of methyl methacrylate unit, 3 parts by weight of acrylonitrile unit, and 3 parts by weight of N-phenyl maleimide unit. The content of copolymer matrix having a molecular weight in the range of 3,000~50,000 is 24 wt %. The resin composition was tested for the physical properties thereof to give the following results: Haze: 6.1%; melt index: 1.9 g/10 min; impact resistance: 18 kg/cm-cm; chemical resistance: good (○). The content of rubber particles having at least 4 occlusions is 5%, while the content of rubber particles having no occlusions is 66%, based on the total number of rubber particles.

According to the results for Comparative Example 1, when the resin composition does not contain acrylonitrile unit and the content of rubber copolymers having a molecular weight in the range of 3,000~50,000 is less than 15 wt %, the resin composition has poor processability (flowability) and poor chemical resistance. According to the results for Comparative Example 2, when the content of polystyrene block in the rubbery copolymer of the resin composition is less than 5 wt %, the resin composition has poor transparency. Moreover, according to the results for Comparative Example 3, when the content of polystyrene block in the rubbery copolymer is less than 5 wt %, the transparency of the resin composition is poor. According to the results of Comparative Example 4, when the content of copolymer matrix (B) having molecular weight in the range of 3,000~50,000 is higher than 50 wt %, based on the total weight of the copolymer matrix (B), the resin has poor impact resistance and poor chemical resistance.

In the Examples of the present invention, by controlling the content of the polystyrene block in the rubbery copolymer, the content of copolymers matrix having molecular weights in the range of 3,000~50,000, and the content of acrylonitrile unit in the copolymer matrix (B), the resin composition can have good chemical resistance, processability, good transparency and impact resistance.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

Table 1: Reaction components and physical properties for Examples 1 to 4 and Comparative Examples 1 to 4.

TABLE 1

| | | Example | | | | Comparative Example | | | |
|---|---|---|---|---|---|---|---|---|---|
| Item | | 1 | 2 | 3 | 4 | 1 | 2 | 3 | 4 |
| Copolymer matrix | Styrenic unit (part) | 32 | 34 | 34 | 34 | 37 | 47 | 44 | 33 |
| | (Meth)acrylate unit (part) | 60 | 63 | 63 | 63 | 63 | 47 | 53 | 64 |
| | Vinyl cyanide unit (part) | 8 | 3 | 3 | 3 | — | 6 | 3 | 3 |
| | Content of copolymer matrix having a molecular weight of 3,000~50,000 (wt %) | 29 | 34 | 33 | 36 | 12 | 33 | 33 | 52 |
| Rubbery copolymer | Content of Styrenic monomer unit (wt %) | 25 | 25 | 25 | 25 | 30 | 15 | 5 | 25 |
| | Content of polystyrene block (wt %) | 18 | 19 | 18 | 15 | 21 | 2 | 0 | 18 |
| | Content of 1,2-vinyl structure (%) | 15.4 | 18.0 | 15.4 | 12.5 | 11 | 15.4 | 18.0 | 15.4 |
| Rubber particle dispersed phase | Content of rubber particles having at least 4 occlusions (%) | 6 | 8 | 5 | 4 | 1.8 | 9 | 30 | 5 |
| | Content of rubber particles having no occlusions (%) | 64 | 60 | 65 | 58 | 75 | 15 | 2 | 65 |
| Physical property test | Melt index (g/10 min) | 2.0 | 2.1 | 2.3 | 2.5 | 1.3 | 2.0 | 1.8 | 5.0 |
| | Impact resistance (kg/cm-cm) | 19 | 19 | 18 | 17 | 12 | 18 | 23 | 9 |
| | Transparency (Haze)% | 5.9 | 5.5 | 5.1 | 3.8 | 7.2 | 11.5 | 12.6 | 11.0 |
| | Chemical resistance | ○ | ○ | ○ | ○ | X | ○ | ○ | Δ |

I claim:

1. A transparent rubber-modified styrenic resin composition, comprising:
   (1) a rubber-particle-dispersed phase (A) containing a rubbery copolymer which is a non-hydrogenated block copolymer formed from 10 to 50 wt % of styrenic monomers and 90 to 50 wt % of dienic monomers; wherein said rubbery copolymer contains polystyrene block in an amount of 5 to 35 wt %, based on total weight of said rubbery copolymer, said rubbery copolymer further containing from more than 8 wt % up to 18 wt % of 1,2-vinyl structure; and
   (2) a copolymer matrix (B) which is composed of 12 to 70 parts by weight of styrenic unit, 20 to 80 parts by weight of an ester of (meth)acrylic acid unit, 1 to 20 parts by weight of vinyl cyanide unit, and 0 to 40 parts by weight of other copolymerizable monomer units, based on 100 parts by weight of total monomer unit; wherein molecules of said copolymer matrix (B) having molecular weights of 3,000–50,000 are present in an amount of 15 to 50 wt %, based on the total weight of said copolymer matrix (B).

2. The transparent rubber-modified styrenic resin composition as claimed in claim 1, wherein the content of rubber particles having at least four occlusions is 2 to 20%, based on the total number of rubber particles of said rubber-particle-dispersed phase (A).

3. The transparent rubber-modified styrenic resin composition as claimed in claim 1, wherein the content of rubber particles having no occlusions is 20 to 80%, based on the total number of rubber particles of said rubber-particle-dispersed phase (A).

4. The transparent rubber-modified styrenic resin composition as claimed in claim 1, wherein said rubbery copolymer is a tapered block copolymer.

5. The transparent rubber-modified styrenic resin composition as claimed in claim 4, wherein said tapered block copolymer is selected from the group consisting of D-D/S-S, D-S-D/S-S, and D-D/S-S-S-D/S-D, and wherein S is polystyrenic block, D is polydienic block, and D/S is a dienic/styrenic tapered block.

6. The transparent rubber-modified styrenic resin composition as claimed in claim 1, wherein said rubbery copolymer contains 10 to 25 wt % of polystyrene block.

7. The transparent rubber-modified styrenic resin composition as claimed in claim 1, wherein said rubbery copolymer contains 14 to 22 wt % of polystyrene block.

* * * * *